United States Patent
Mahableshwarkar et al.

[11] Patent Number: 5,950,441
[45] Date of Patent: Sep. 14, 1999

[54] METHOD AND APPARATUS FOR CONTROLLING AN EVAPORATIVE GAS CONDITIONING SYSTEM

[75] Inventors: Anand Mahableshwarkar, Olathe, Kans.; Michael M. Mahler, Hayes, Va.; David F. Johnston; Robert Hummell, both of Yorktown, Va.

[73] Assignee: BHA Group Holdings, Inc., Kansas City, Mo.

[21] Appl. No.: 08/948,912

[22] Filed: Oct. 10, 1997

[51] Int. Cl.$^6$ .................................................. F28C 1/00
[52] U.S. Cl. ............................................. 62/171; 236/75
[58] Field of Search ............................ 62/171, 121, 180, 62/208, 310, 314; 318/596; 236/75

[56] References Cited

U.S. PATENT DOCUMENTS 3,672,182   6/1972   Stowasser et al. ...................... 62/121

*Primary Examiner*—William Doerrler
*Attorney, Agent, or Firm*—Shook, Hardy & Bacon, LLP

[57] ABSTRACT

Method and apparatus for controlling an evaporative gas conditioning system utilizes a controller for controlling the rate at which liquid is introduced into a conditioning chamber, thereby closely controlling the rate at which temperature within the conditioning chamber is adjusted to a desired temperature. Nozzle characteristics of a plurality of different nozzle types are stored in a memory associated with the controller, so that when existing nozzles are replaced with a different nozzle type, an operator can select the new nozzle type, and data stored in memory will be retrieved to permit efficient control of the system without the necessity for manual reconfiguration. Additionally, spray nozzles for spraying water into the conditioning chamber of the system are organized into banks of nozzles, and the banks of nozzles are controlled to maintain optimum water flow through each nozzle, and to evenly distribute the water into the conditioning chamber. Additionally, steady state or stable operation of the system is monitored and data indicative of operating conditions during stable operation, for various conditions, are stored in memory. Upon a change in conditions, such as from a mill on to a mill off condition, data indicative of stable operation with respect to said operating condition is retrieved, and utilized in controlling system 10, particularly, in controlling the volume of liquid introduced into the conditioning chamber, to thereby drastically reduce the transition time associated with a change in mill on/mill off condition.

17 Claims, 8 Drawing Sheets

METHOD AND APPARATUS FOR CONTROLLING AN EVAPORATIVE GAS CONDITIONING SYSTEM

BACKGROUND OF THE INVENTION

1. Field of the Invention

The present invention is directed to an evaporative gas conditioning system for conditioning gases resulting from industrial processes. More particularly, the present invention is directed to a method and apparatus for controlling an evaporative gas conditioning system.

2. Description of the Related Art

Evaporative gas conditioning systems for cooling and conditioning hot gases produced by industrial processes are well known. Evaporative gas conditioning systems are most commonly utilized upstream from pollution control equipment, such as an electrostatic precipitator or a baghouse, so as to condition, or prepare, the industrial gases for the pollution control equipment. As hot, particulate laden gas resulting from an industrial process, such as a kiln or furnace operation, is introduced into a conditioning chamber or duct of an evaporative gas conditioning system, the physical and chemical properties of the gas are operated upon for the benefit of the air pollution control equipment located downstream. Particularly, conditioning of the gas typically involves altering the temperature, moisture content, resistivity of the dust and chemical composition of the gas.

Conventionally, industrial gases introduced into a conditioning chamber of an evaporative gas conditioning system are conditioned by spraying water into the gas stream. Spraying of water into the gas stream results in a reduction in the temperature of the gas, a reduction in the gas volume handled by the downstream air pollution control equipment, a reduction in resistivity of particulate located within the gas stream, and an increase in the overall moisture content of the gas.

Evaporative gas conditioning systems conventionally fall into one of two categories—single fluid systems and dual fluid systems. Single fluid evaporative gas conditioning systems are characterized by the introduction of only high-pressure liquid (water) for conditioning purposes. In contrast, dual fluid evaporative gas conditioning systems introduce both water and air at lower pressure into the gas stream. In either type of system, water is introduced into the gas stream by nozzles, which output a spray in the form of water droplets. Typically, single fluid evaporative gas conditioning systems are characterized by water droplets of 350 microns or more in size, while dual fluid systems output much smaller water droplets, often on the order of 50–136 microns. Dual fluid evaporative gas conditioning systems therefore typically utilize less water than single fluid systems, and are able to operate with smaller conditioning towers. Moreover, one advantage of a dual fluid evaporative gas conditioning system is that, since the water droplets are smaller, it is more likely that they will evaporate before passing through the conditioning chamber, thus preventing downstream water damage.

In the past, dual fluid evaporative gas conditioning systems were controlled utilizing a control loop known as proportional integral derivative, or PID. As will be appreciated by those with skill in the art, a primary drawback with the PID approach is, when introducing water into the conditioning chamber to lower the temperature of the gas from a sensed temperature to a desired temperature, it is common to overshoot the desired temperature, which thus requires a correction. However, when undertaking correction, it is not uncommon for control systems based upon a PID loop to over correct, and so forth, resulting in oscillation of temperature above and below the desired temperature. The resulting output from the conditioning chamber is thus unstable, causing performance problems and possible equipment damage downstream from the conditioning system. Additionally, a specific drawback of the PID approach is the inability of the system to be sensitive to on-going conditions in the system, and to respond as necessary to those on-going conditions. More specifically, with the PID approach, the nozzles utilized to introduce water droplets into the conditioning chamber cannot be adequately controlled to adjust the rate at which water is introduced into the chamber, thus resulting in the oscillation problems described.

In response to the limitations of the PID loop approach, the present applicant developed an evaporative gas conditioning system which took a different approach. In that system, water was introduced into the conditioning chamber at a first maximum rate when the temperature of the gas in the chamber was more than a selected amount away from the desired temperature. Upon reaching a predetermined threshold temperature, the rate at which water was supplied to the conditioning chamber to cool gas was based upon a linear function. However, it has been determined that such a system has numerous drawbacks, is limited in its ability to efficiently respond to conditions in the conditioning chamber, and results in an unacceptable overall performance by the conditioning system.

An additional problem with conventional evaporative gas systems is their inflexibility to accommodate nozzles having different characteristics. In other words, in the design of a conventional evaporative gas conditioning system, once a nozzle is selected, the performance parameters of the system are designed around the characteristics of the selected nozzle. In the event that it becomes necessary or desirable to change the nozzles to a type having different characteristics at a later time, conventional systems require a substantial reconfiguration to accommodate the new nozzle type.

Accordingly, the need exists for a dual fluid evaporative gas conditioning system which is responsive to the on-going conditions within the conditioning chamber of the system. Additionally, the need exists for an evaporative gas conditioning system that does not have the temperature overshoot problems associated with utilization of the PID loop, and which overcomes the drawbacks of the linear approach taken in other prior art.

Additionally, the need exists for an evaporative gas conditioning system which is easily adjustable to utilized nozzles having different performance characteristics. The present invention overcomes the drawbacks of the prior art, and meets these and other needs.

SUMMARY OF THE INVENTION

An object of the present invention is to provide an efficient control system for an evaporative gas conditioning system.

Another object of the present invention is to provide an evaporative gas conditioning system having the flexibility to permit easy and efficient change of the type of nozzles utilized in the system.

An additional object of the present invention is to prevent overshooting a desired temperature of a gas when conditioning the gas in an evaporative gas conditioning system.

These and other objects are achieved by an evaporative gas conditioning system having a conditioning tower for receiving hot gases produced from an industrial process, such as a plant, kiln, or combustion process. The hot gases from the kiln or process are received at a gas conditioning chamber, tower or duct inlet located downstream from the combustion chamber, and are passed through the gas conditioning chamber, tower or duct to a gas outlet located further downstream from the conditioning chamber. A number of nozzles are positioned at an upstream location within the conditioning chamber for spraying water droplets into the chamber, to condition the gases and to lower the temperature of the gases to a desired temperature.

In accordance with the principles of the present invention, the evaporative gas conditioning system is a dual fluid system, such that each nozzle is connected to both a water supply and a compressed air supply. The compressed air atomizes the water droplets in addition to the mechanical shearing that takes place inside the nozzle. A combination water flow valve positioner and flow valve are positioned in the water supply line. Additionally, the combination of a transducer and flow transmitter are positioned within the water supply line. Each of these combinations is connected to a controller. The controller is preferably a programmable logic circuit, or microprocessor. The controller has a memory, a keypad, and a display.

Located in the air supply line, for supplying air from the compressed air supply to the nozzles, is a combination air valve positioner and an air flow valve. Also located in the air supply line, between the compressed air supply and the nozzles, is an air pressure transmitter. Both the pressure transmitter and the combination air valve positioner and flow valve are connected to the controller.

A first temperature transmitter is connected to the controller and the gas inlet of the conditioning chamber, while a second temperature transmitter is connected to the controller and the gas outlet of the conditioning chamber.

The memory associated with the controller has stored therein nozzle characteristics of a number of different types of nozzles. In this way, in accordance with an aspect of the invention, as the nozzles in the conditioning chamber are replaced with a different type of nozzles, an operator, utilizing the keypad, can quickly enter the type of nozzles utilized, and the system will recognize those nozzles, and be able to control conditioning of the industrial gases without the necessity to reconfigure the system.

In operation, the controller receives a signal, from a selected one of the temperature sensors, indicative of the actual temperature of gases within the conditioning chamber. The controller determines a difference between the actual gas temperature and the desired gas temperature, as input by an operator. According to the principles of the invention, when the temperature difference is outside a selected temperature range, then a first rate of change to the desired liquid flow rate is selected for spraying water into the chamber. However, when the temperature difference is within a selected temperature range, then a second rate of change to the desired liquid flow rate is selected for controlling the nozzles, and thus for controlling the spraying of water into the conditioning chamber.

In accordance with the principles of the present invention, the second desired liquid flow rate of change is a function of the determined temperature difference between the actual temperature and the desired temperature, and the selected temperature range. Thus, in accordance with the principles of the invention, when the temperature of the gas is more than a selected temperature from the desired temperature, a first rate of change for controlling the flow of liquid into the chamber is utilized. However, as the actual temperature of the gas falls within a selected temperature from the desired temperature, a second flow rate of change is utilized. Additionally, according to the present invention, the second flow rate changes, and in fact slows down, the nearer the actual temperature gets to the selected temperature.

In accordance with another aspect of the invention, as briefly noted above, characteristics of a number of different nozzle types are stored in memory. Particularly, during operation of the present invention, to determine the appropriate air pressure to be supplied to the nozzles for spraying the appropriate amount of water into the conditioning chamber, the present invention retrieves from memory the characteristics associated with the selected nozzle type, in order to calculate the appropriate air pressure.

In accordance with another aspect of the invention, the nozzles are organized into separate banks of nozzles, such that a first set of nozzles are associated with a first bank of nozzles, a second set of nozzles are associated with a second bank of nozzles, and so on. When the liquid flowing from the nozzles is greater than the maximum nozzle flow as defined by the nozzle characteristics, the controller will turn on a next bank of nozzles, to maintain optimum liquid flow through each nozzle and to more evenly distribute the liquid into the chamber. Conversely, when the liquid flow from the nozzles is less than the defined minimum nozzle flow characteristic associated with the type of nozzles being utilized, the controller will turn off a bank of nozzles, so that the flowing liquid will be distributed to a fewer number of nozzles, thus preventing a dribble effect.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
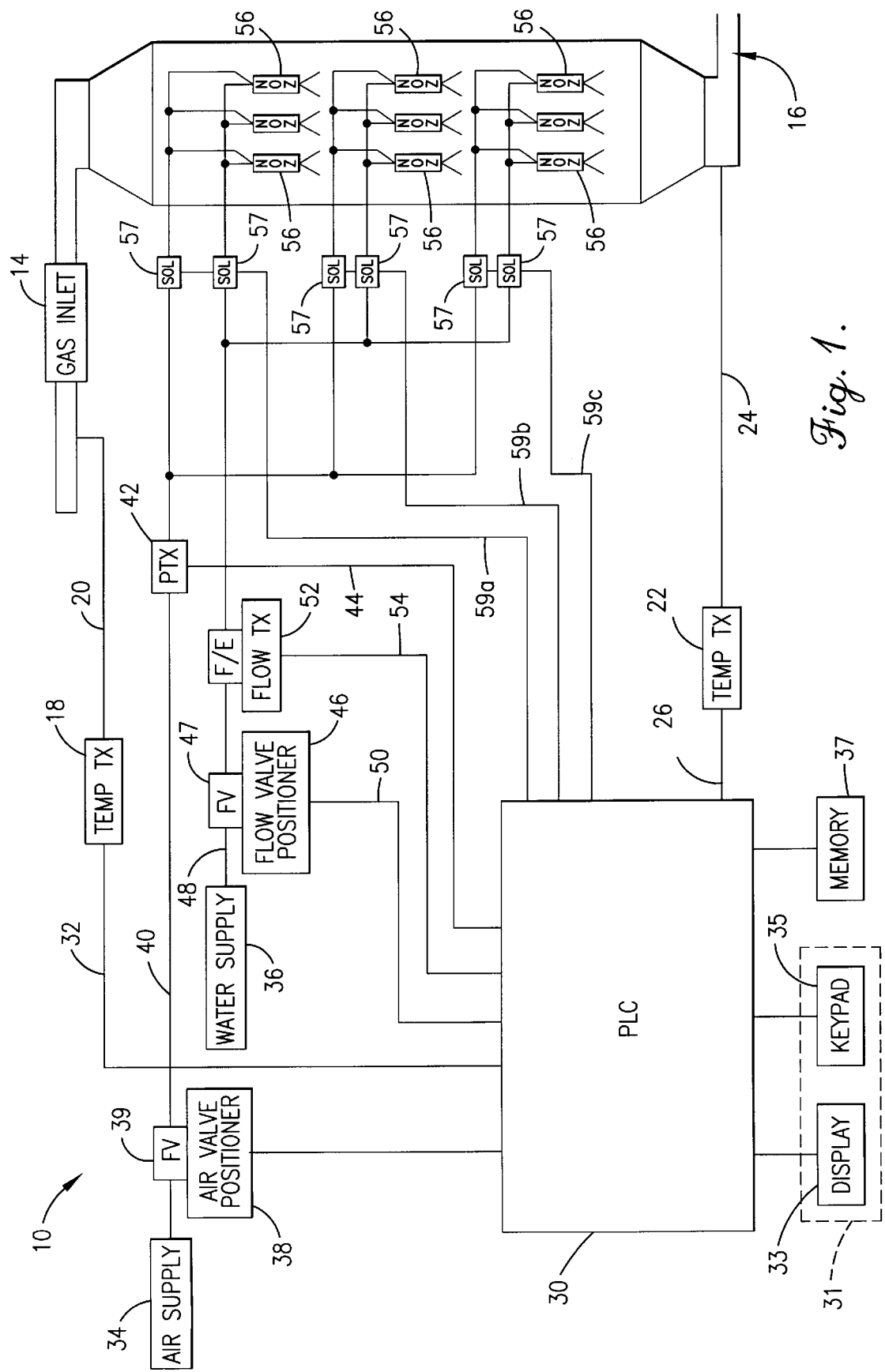
FIG. 1 is a block diagram schematically illustrating the evaporative gas conditioning system of the present invention.

With reference initially to FIG. 1, the evaporative gas conditioning system of the present invention is denoted generally by reference numeral 10. Evaporative gas conditioning system 10 has a conditioning tower, denoted by conditioning chamber 12. Conditioning chamber 12 is a gas inlet 14 and a gas outlet 16. A first temperature transmitter 18 is connected by line 20 to gas inlet 14. A second temperature transmitter 22 is connected by line 24 to gas outlet 16. The second temperature transmitter 22 is also connected, via line 26, to a controller 30. Controller 30 is illustrated as a programmable logic circuit, but could be a microprocessor, or any other known type of controller. An operator interface 31, consisting of a display 33 and keypad on keyboard 35, as well as a memory 37, are connected to controller 30, as illustrated. Second temperature transmitter 18 is connected via line 32 to controller 30.

Evaporative gas conditioning system 10 also has a compressed air supply 34, and a water supply 36. A combination air valve positioner 38 and air flow valve 39 are positioned within air supply line 40, and are connected to controller 30.

A pressure transmitter 42 is located in air supply line 40, and is connected, via line 44, to controller 30. A combination flow valve positioner 46 and liquid flow valve 47 are connected in water supply line 48, as illustrated. The combination flow valve positioner and flow valve are connected to controller 30 via line 50. Additionally, a transducer/flow transmitter combination, designated generally by reference numeral 52, are connected in water supply line 48, as shown, and are connected, via line 54, to controller 30.

A plurality of nozzles 56 are suspended within conditioning chamber 12. Nozzles 56 emit a spray, as shown, of water droplets for conditioning and cooling the gas introduced into the conditioning chamber 12. Particularly, nozzles 56 are organized into a plurality of banks of nozzles, as illustrated. In this regard, each bank of nozzles has a plurality of nozzles associated therewith. The number of banks utilized and the number of nozzles per bank, are matters of design choice. As illustrated, solenoids 57 for turning a bank of nozzles on and off, are positioned as shown. The solenoids 57 are connected to controller 30 via lines 59a, 59b, and 59c. In accordance with the principles of the present invention, as illustrated, the evaporative gas conditioning system 10 is a dual fluid conditioning system, utilizing both compressed air and water.

Upon initial set up of the system, an operator, utilizing keypad 35, enters a number of data values into the controller 30, to define the preferred operation of evaporative gas control system 10. For example, upon initial setup of the system, the operator enters the desired target temperature of the gas to be outlet from gas outlet 16 of conditioning chamber 12. Specifically, the operator enters two target temperatures, one for an off mill condition, and one for an on mill condition. Additionally, as will be described in greater detail below, the operator also enters a data value indicative of a FASTRATE for adjusting a calculated TARGETFLOW of the liquid introduced into conditioning chamber 12. In this regard, TARGETFLOW is zero when system 10 is initially turned on. However, as system 10 operates and nozzles 56 introduce water into chamber 12, the TARGETFLOW value is adjusted, and stored in memory, in accordance with the volume flow of water from the nozzles 56. The operator also enters a SLOWRATE for adjusting the TARGETFLOW. The SLOWRATE is utilized in a calculation to determine the actual rate of adjustment when operating conditions are within a defined TEMPERATURE CONTROL RANGE. That TEMPERATURE CONTROL RANGE is yet another entry made by the operator upon initial start up of the system.

Additionally, the operator also enters a FASTRATE for adjusting the liquid control valve, a SLOWRATE for adjusting the liquid control valve, and a target flow CONTROLRANGE associated with the liquid control valve. Additionally, the operator also enters a FASTRATE and a SLOWRATE for adjusting the air flow control valve, and a CONTROLRANGE associated with the air flow control valve. The nature and purpose of these entries is described in detail below.

In accordance with an aspect of the present invention, memory 37 of evaporative gas conditioning system 10 has stored therein characteristics for a plurality of different types of nozzles. In this regard, as will be readily appreciated by those skilled in the art of evaporative gas conditioning systems and nozzles, nozzle manufacturers publish data, typically in graphical form, of nozzle characteristics and nozzle performance. Specifically, such characteristics typically include the water flow rate performance of the nozzle at different air and water pressures, and also include the sauter mean diameter associated with the nozzle. In accordance with the principles of the present invention, an evaporative gas control system typically employs a plurality of nozzles of the same type. In operation, as described in detail below, the operator selects the type of nozzles being utilized using keypad 35, and nozzle performance characteristics stored in memory are extracted from memory and utilized in the control of system 10.

With reference now to FIGS. 2–8, detailed operation of the evaporative gas control system 10 of the present invention is illustrated and described.

Figure 2:
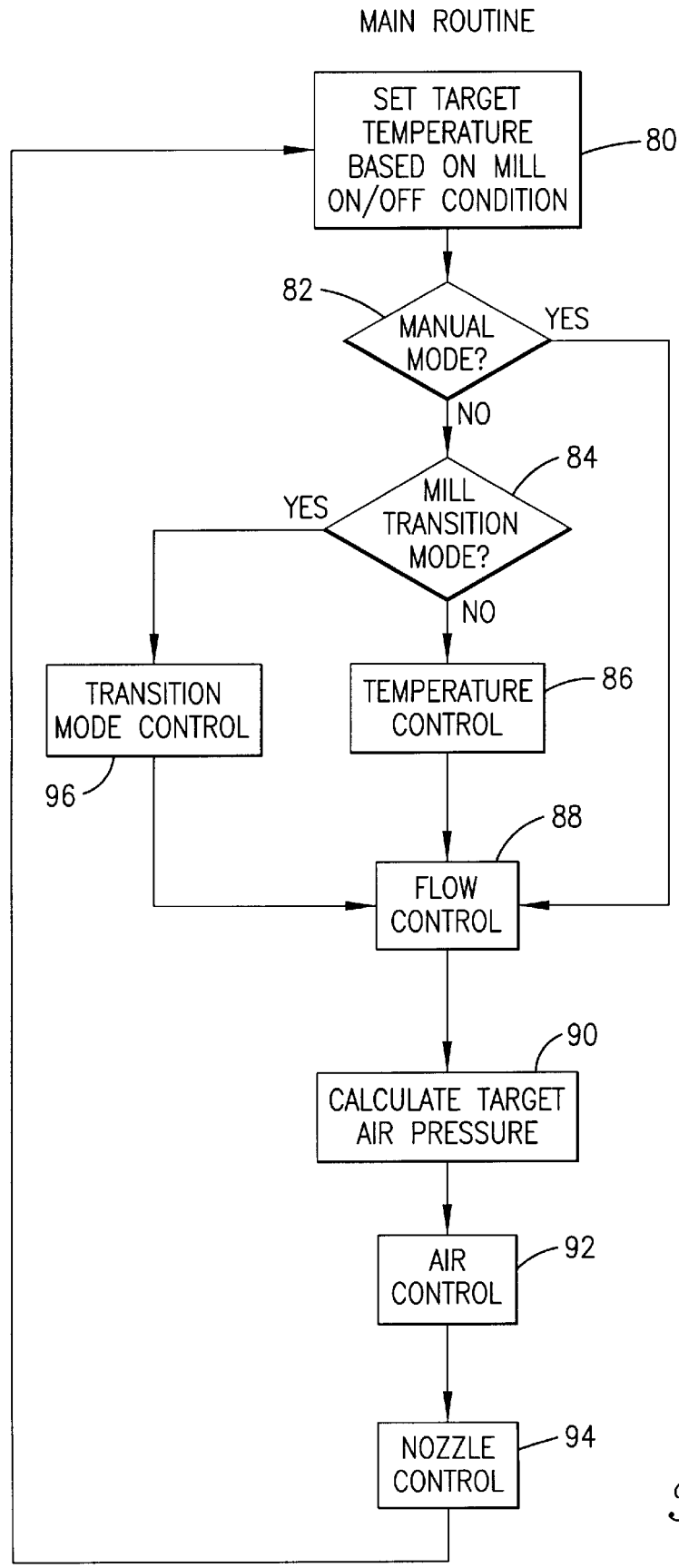
FIGS. 2–8 are flow charts illustrating operation of the evaporative gas conditioning system of the present invention.

With reference initially to FIG. 2, a MAIN ROUTINE, executed by controller 30, illustrates the primary logic associated with the present invention. At step 80, utilizing keypad 35, an operator of evaporative gas control system 10 sets a target temperature based upon an on/off condition of a mill, or other industrial components which emit hot industrial gas. As will be readily appreciated by those skilled in the art, the operator enters two target temperatures for the gas, one for the off condition of the mill, and one for an on condition of the mill. Particularly, at this stage, the operator selects a desired, target temperature of the gas during operation of the industrial process, and the evaporative gas conditioning system 10. It will be readily understood and appreciated that the actual temperature selected is based upon the overall operating conditions involved and desired.

As indicated at step 82, controller 30 determines whether evaporative gas conditioning system 10 is in a manual mode. Utilizing keypad 35 on controller 30, an operator of system 10 can select a manual mode or an automatic mode. When the operator has selected a manual mode, controller 30 determines at step 82 that a manual mode has been entered, and processing bypasses temperature control step 86, and proceeds directly to flow control step 88. In this regard, in accordance with the principles of the present invention, when an operator selects a manual mode of operation, the operator enters a target liquid flow rate, as described in greater detail below, for nozzles 56.

When controller 30 determines at step 82 that evaporative gas conditioning system 10 is not in the manual mode of operation, but is rather in automatic mode, processing proceeds to step 86, which is a TEMPERATURE CONTROL subroutine, as described in greater detail below in connection with FIG. 3. As described below, the primary purpose of the TEMPERATURE CONTROL subroutine is to determine a desired, target flow of liquid from nozzle 56, and to determine a rate at which the liquid flow is to be adjusted, depending upon conditions in the evaporative gas conditioning temperature chamber 12.

Upon completion of the TEMPERATURE CONTROL subroutine 86, processing proceeds to a FLOW CONTROL subroutine, as indicated generally by reference numeral 88 in FIG. 2. The FLOW CONTROL subroutine is described in detail with reference to FIG. 5, and has a primary purpose of controlling the flow valve 47 for controlling introduction of liquid, through nozzles 56, into conditioning chamber 12.

Upon completion of processing of the FLOW CONTROL subroutine, the processing proceeds to a subroutine, designated generally by reference numeral 90, entitled CALCULATE TARGET AIR PRESSURE. The subroutine CALCULATE TARGET AIR PRESSURE is described in detail, below, in reference to FIG. 6. The primary purpose of the CALCULATE TARGET AIR PRESSURE subroutine is to determine a desired, target air pressure for controlling nozzles 56. Upon completion of the CALCULATE TARGET AIR PRESSURE subroutine at step 90 in FIG. 2, processing advances to step 92, for execution of the AIR CONTROL subroutine. The AIR CONTROL subroutine has a primary purpose of controlling the air control valve 39 for controlling nozzles 56, utilizing the determined target air pressure from the CALCULATE TARGET AIR PRESSURE subroutine. Upon completion of the AIR CONTROL subroutine, processing advances to a NOZZLE CONTROL subroutine, as indicated by step 94 of FIG. 2. The NOZZLE CONTROL subroutine is described in detail with reference to FIG. 8, and accomplishes selective control of nozzles 66 so that selected banks of nozzle 56 may be on, while other banks of nozzles 56 are off. Upon completion of the NOZZLE CONTROL subroutine at step 94 of FIG. 2, processing returns to the beginning of the MAIN ROUTINE.

As indicated in step 84, controller 30 determines whether the mill (or other industrial equipment) is in a transition mode. In this regard, when the mill or other industrial equipment changes from on to off or off to on, the logic of the present invention sets a flag to indicate to controller 30 that the mill or other industrial equipment is in a transition mode.

Returning to step 84, when controller 30 determines that the mill or other industrial equipment is in a transition mode, processing advances to step 96 for execution of a TRANSITION MODE CONTROL subroutine. The TRANSITION MODE CONTROL subroutine is described in detail below in connection with FIG. 4, and operates only during a transition stage, such as when a mill is initially turned on or off. Upon completion of processing of the TRANSITION MODE CONTROL subroutine, processing advances to step 88, for execution of the FLOW CONTROL subroutine.

As illustrated, FIG. 2 provides a main processing routine for operation and control of evaporative gas control system 10. As described in greater detail below, when system 10 is not in a transition mode or manual mode, the TEMPERATURE CONTROL subroutine determines a desired TARGET FLOW for the nozzles 66, and calculates a rate for adjusting the TARGET FLOW based upon conditions in the conditioning chamber 12. The FLOW CONTROL routine, which allows controller 30 to control the liquid control valve 60, utilizes the determined TARGET FLOW from the TEMPERATURE CONTROL subroutine in its control of the liquid control valve. In a similar manner, the AIR CONTROL subroutine utilizes a determined target air pressure determined from the CALCULATE TARGET AIR PRESSURE subroutine.

Figure 3:
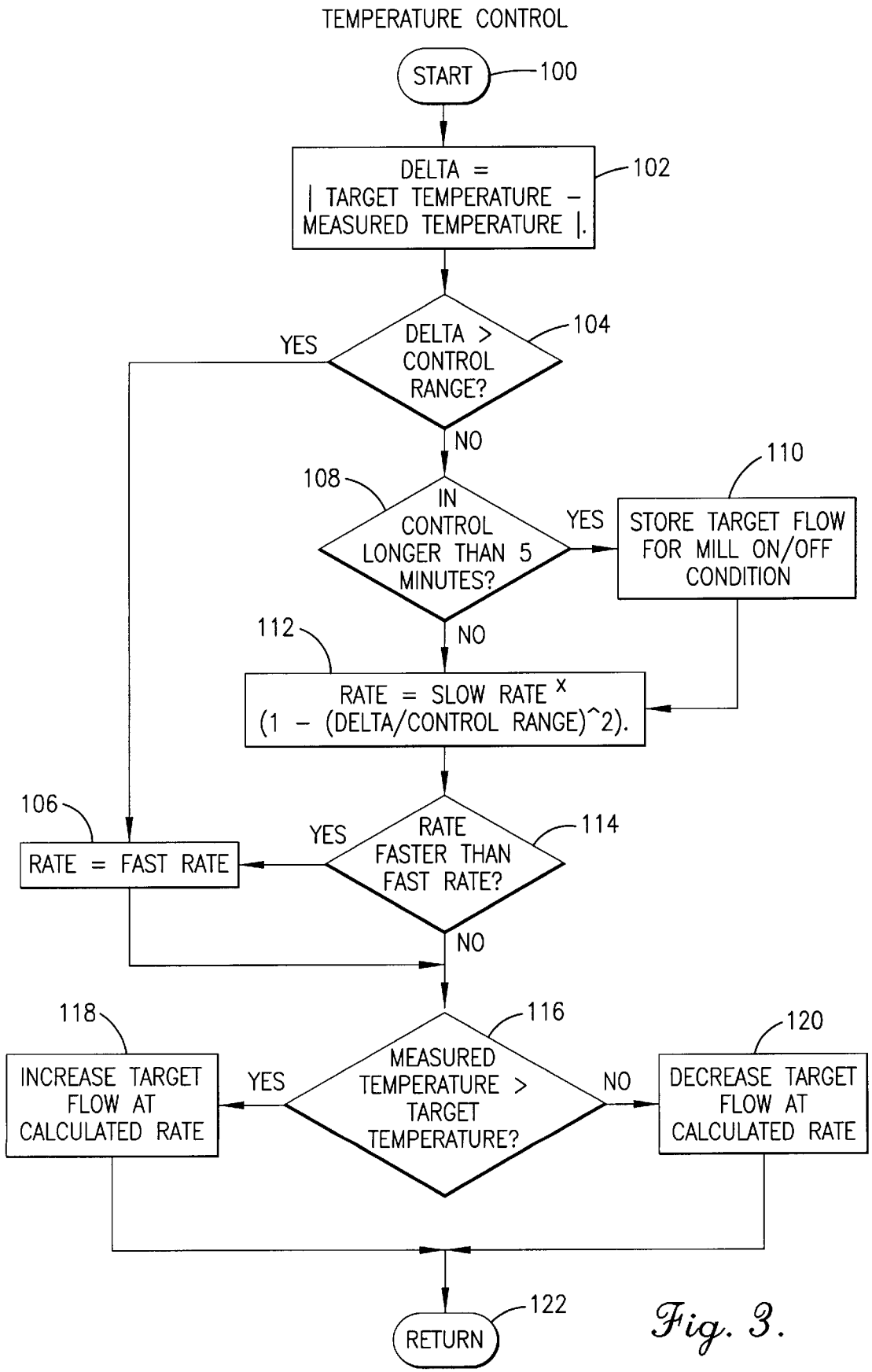
Figure 4:
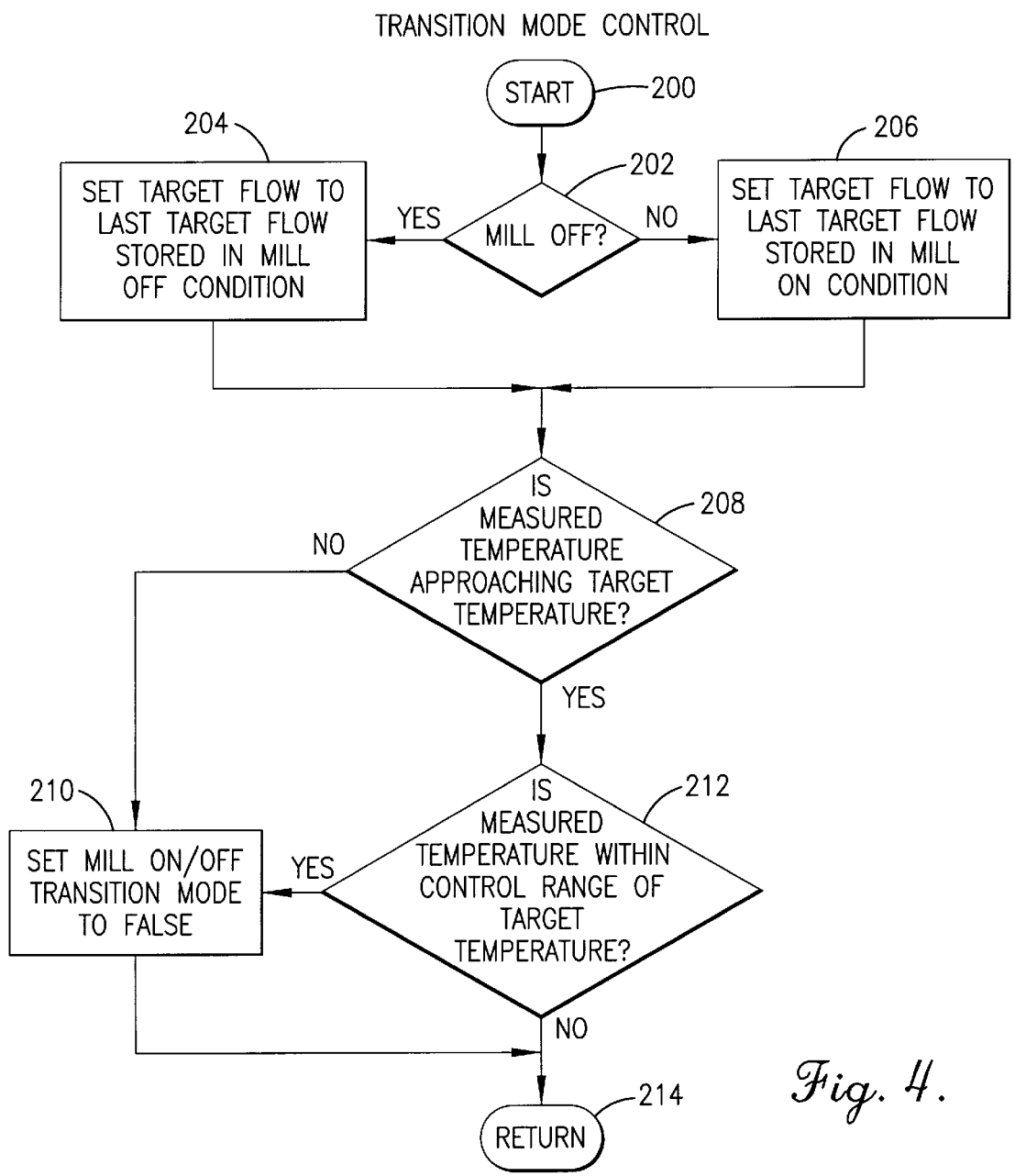

With additional reference to FIG. 3, when processing in the MAIN ROUTINE reaches the TEMPERATURE CONTROL subroutine, as indicated by reference numeral 86, processing advances to the start, designated by reference numeral 100, of the TEMPERATURE CONTROL subroutine illustrated in FIG. 3. At step 102, controller 30 determines the "DELTA", which is equal to the absolute value of TARGET TEMPERATURE minus MEASURED TEMPERATURE. The TARGET TEMPERATURE utilized to calculate DELTA is taken from the data input by the operator, while the MEASURED TEMPERATURE is measured with a selected one of the temperature sensors 18, 22, typically a thermocouple. At step 104, controller 30 determines whether DELTA is greater than CONTROLRANGE. In this regard, the CONTROLRANGE identified in FIG. 3 is a range of temperatures established by the user, as described above. Specifically, upon initial set up of system 10, the operator enters a CONTROLRANGE, with the minimum of the range being TARGET TEMPERATURE, and the maximum of the range being a selected temperature. In this fashion, controller 30 determines at step 104 whether DELTA, that being the difference between TARGET TEMPERATURE and MEASURED TEMPERATURE, is within the CONTROLRANGE. For example, in an operation where the TARGET TEMPERATURE is 300° F., but the MEASURED TEMPERATURE is 350° F., a user may enter the maximum value of the CONTROLRANGE at 10°, which will result in a CONTROLRANGE of 290° F. to 310° F. in this example. When it is determined at step 104 that DELTA is greater than the CONTROLRANGE, processing advances to step 106 wherein controller defines a rate as FASTRATE. The FASTRATE is the number of seconds (in hundreds of seconds) it would take the control to move from its minimum flow to its maximum flow rate. The FASTRATE is a selected volume of liquid flow per minute, per second, and the FASTRATE is typically set by the operator to be between 20 and 40 hundreds of seconds. This setting of FASTRATE is made by the operator using keypad 35 upon initial setup of the system 10.

When, however, at step 104, controller 30 determines that DELTA is not greater than CONTROLRANGE, processing advances to step 108 wherein controller 30 determines whether DELTA has been with the CONTROLRANGE longer than 5 minutes. When it is determined at step 108 that DELTA has been with the CONTROLRANGE longer than 5 minutes, processing advances to step 110, where controller 30 stores TARGETFLOW into memory 37. Again, TARGETFLOW is a data value, determined by controller 30, indicative of the volume of liquid flowing from nozzles 56, and will thus be a dynamic value which changes as system 10 changes.

When it is determined at step 108 that DELTA has not been within the control range longer than 5 minutes, or, upon completion of the processing step 110, processing advances to step 112, wherein the rate is defined according to the following equation:

$$RATE = SLOWRATE \times (1 - (\Delta/CONTROLRANGE)^2)$$

In this regard, SLOWRATE is a rate entered by the user during initial setup of the system, and is typically between 10 and 50 hundreds of seconds, DELTA is a value, as defined in step 102, and CONTROLRANGE is the maximum value of the CONTROLRANGE previously described. At step 114, controller 30 determines whether the rate is faster than the FASTRATE and, when it is faster, processing advances to step 106 to clamp the rate at the FASTRATE. When, however, at step 114 controller 30 determines that the rate is not faster than the FASTRATE, processing advances to step 116 where controller 30 determines whether the MEASURED TEMPERATURE is greater than the TARGET TEMPERATURE. In the event the MEASURED TEMPERATURE is greater than the TARGET TEMPERATURE, processing advances to step 118, where controller 30 increases the target flow at the calculated rate. When, however, it is determined at step 116 that the MEASURED TEMPERATURE is not greater than the TARGET TEMPERATURE, processing advances to step 120, where controller 30 decreases the target flow at the calculated rate. From step 118 or 120, processing advances to step 122, where the subroutine temperature control returns to the main routine.

Figure 5:
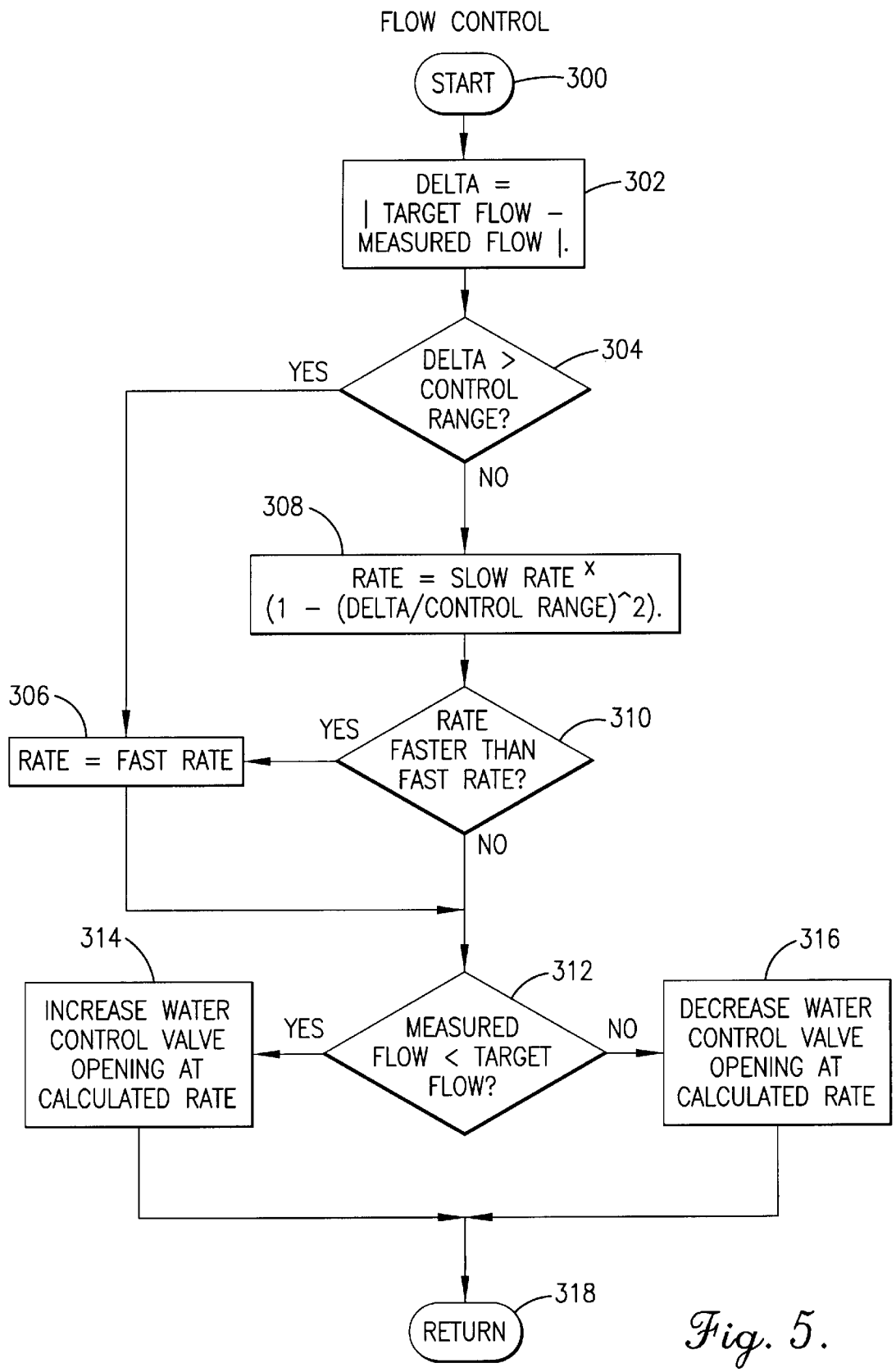

As indicated in FIG. 2, upon completion of subroutine TEMPERATURE CONTROL, processing advances to the subroutine FLOW CONTROL, as illustrated in FIG. 5. Upon starting the FLOW CONTROL subroutine at the start step 300, processing advances to step 302 where DELTA is defined to the absolute value of TARGET FLOW minus MEASURED FLOW. TARGET FLOW is the value determined from subroutine TEMPERATURE CONTROL, while measured flow is the actual value of liquid, as measured by the transducer F\E, flowing from nozzle 56. At step 304, controller 30 determines whether DELTA is greater than CONTROLRANGE. As in the case of TEMPERATURE CONTROL, the CONTROLRANGE, as well as a FASTRATE and a SLOWRATE, are entered by the operator upon initial setup of the system utilizing keypad 35. As an example of data values likely utilized, CONTROLRANGE is typically defined between 2–5 gallons per minute, SLOWRATE is generally approximately 10 hundreds of seconds, while FASTRATE is generally approximately 5 hundreds of seconds. When controller 30 determines at step 304 that DELTA is greater than CONTROLRANGE, processing advances to step 306, where controller 30 defines the rate as the FASTRATE entered by the user. In the case of the FLOW CONTROL subroutine of FIG. 5, the rate defines the percent of opening of the water flow valve 47 per second. When it is determined at step 304 that DELTA is not greater than the CONTROLRANGE, processing advances to step 308 where controller 30 defines rate according to the equation:

$$RATE = SLOWRATE \times (1 - (\Delta/CONTROLRANGE)^2)$$

At step 310, controller 30 determines whether the RATE is faster than the FASTRATE, and when it is, processing advances to step 306 to clamp the rate at the FASTRATE. When, however, it is determined at step 310 that the RATE is not faster than the FASTRATE, processing advances to step 312, where controller 30 determines whether the MEASURED FLOW is less than TARGET FLOW. When it is determined at step 312 that the MEASURED FLOW is less than TARGET FLOW, processing advances to step 314, where controller 30 increases the opening of liquid control valve 47 at the calculated rate. When, however, it is determined at step 312 by controller 30 that the MEASURED FLOW is not less than the TARGET FLOW, processing advances to step 316, where controller 30 decreases the opening of liquid control valve 47 at the calculated rate. Upon completion of either step 314 or 316, processing advances to step 318, and processing returns to the main routine.

Figure 6:
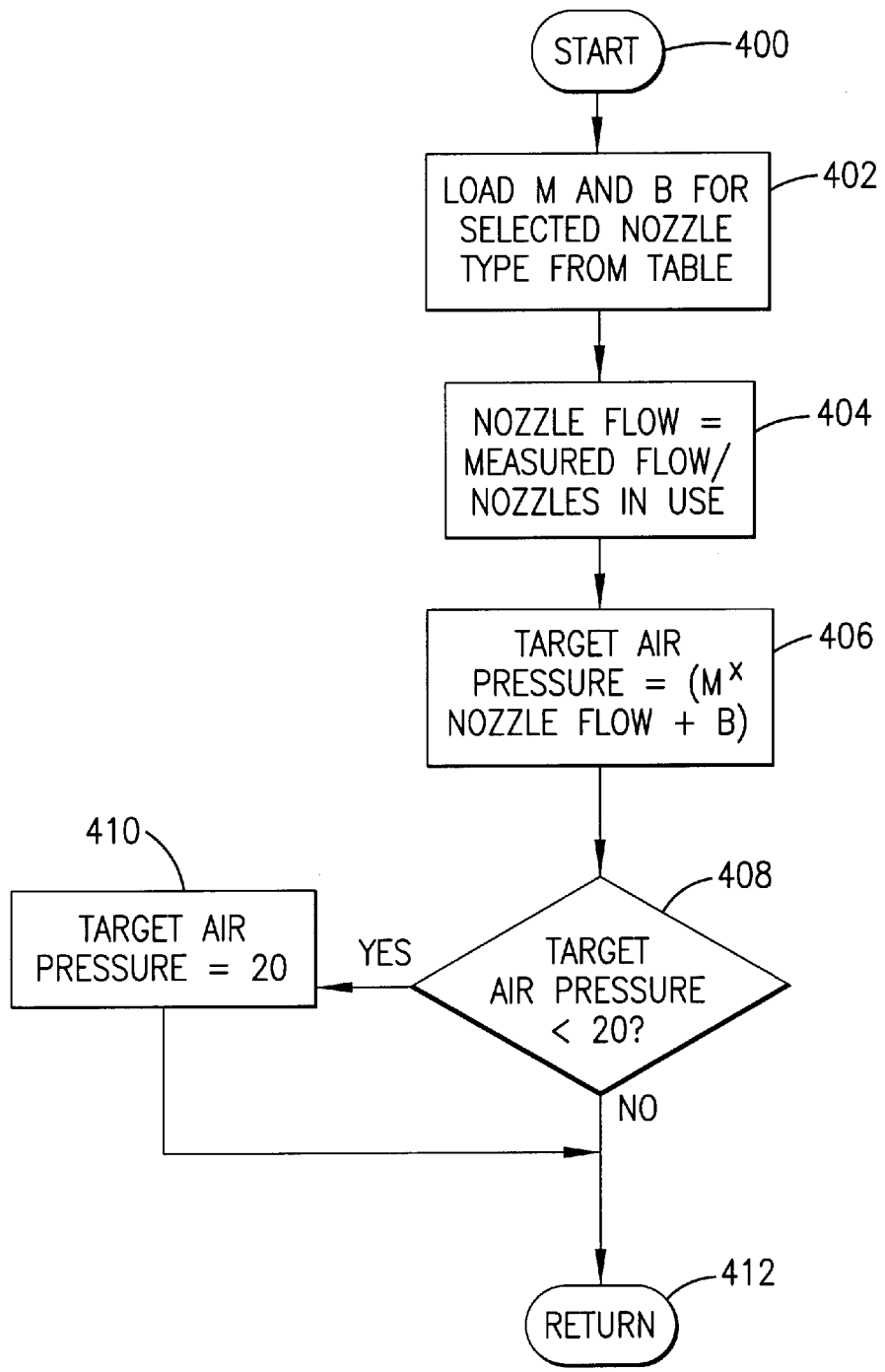

Upon completion of the FLOW CONTROL subroutine, processing advances to the CALCULATE TARGET AIR PRESSURE subroutine, as indicated at reference numeral 90 in FIG. 2. With reference to FIG. 6, the CALCULATE TARGET AIR PRESSURE subroutine is illustrated and described.

With reference now to FIG. 6, the subroutine CALCULATE TARGET AIR PRESSURE is shown and described. Upon the start of the subroutine, at step 400, processing advances to step 402 where controller 30 retrieves from memory 37 nozzle characteristics stored for the type of nozzles 56 utilized in system 10. Particularly, the types of nozzle which may be utilized with control system 10 generally exhibit a linear relationship between air pressure applied to the nozzle and the liquid flow rate of the nozzle for a desired droplet size to be sprayed from the nozzle. That linear relationship can be defined by the ordinary equation for a line, y=Mx+B, where "M" is the slope of the line and B is the y axis intercept of the line. In accordance with the principles of the present invention, as step 404, the nozzle flow and nozzle characteristics stored in memory are that slope for each nozzle type, denoted by "M", and the y axis intercept for each nozzle type, denoted by "B". Accordingly, once controller 30 has retrieved "M" and "B" for the selected nozzle type from the table in memory 37, controller 30 defines NOZZLE FLOW as the actual measured flow, utilizing flow transmitter 52, divided by the number of nozzles in use. In this regard, the number of nozzles in use may be easily calculated by controller 30. At step 406, TARGET AIR PRESSURE is determined by controller 30 according to the following equation:

$$TARGET\ AIR\ PRESSURE = (M \times NOZZLE\ FLOW) + B$$

As processing advances to step 408, controller 30 determines whether the CALCULATED TARGET AIR PRESSURE is less than an arbitrarily set value, in this case 20 psi. In the event the TARGET AIR PRESSURE is less than 20 psi, processing advances to step 410, where the TARGET AIR PRESSURE is adjusted to 20 psi. The purpose of steps 408 and 410 is to maintain the air pressure at a minimum standard to keep the air flow through the nozzles at all times at or above a selected minimum, to thereby keep the nozzles 56 clean and operating efficiently. Upon completion of step 408 or 410, processing returns to the MAIN ROUTINE, as indicated by step 412.

Figure 7:
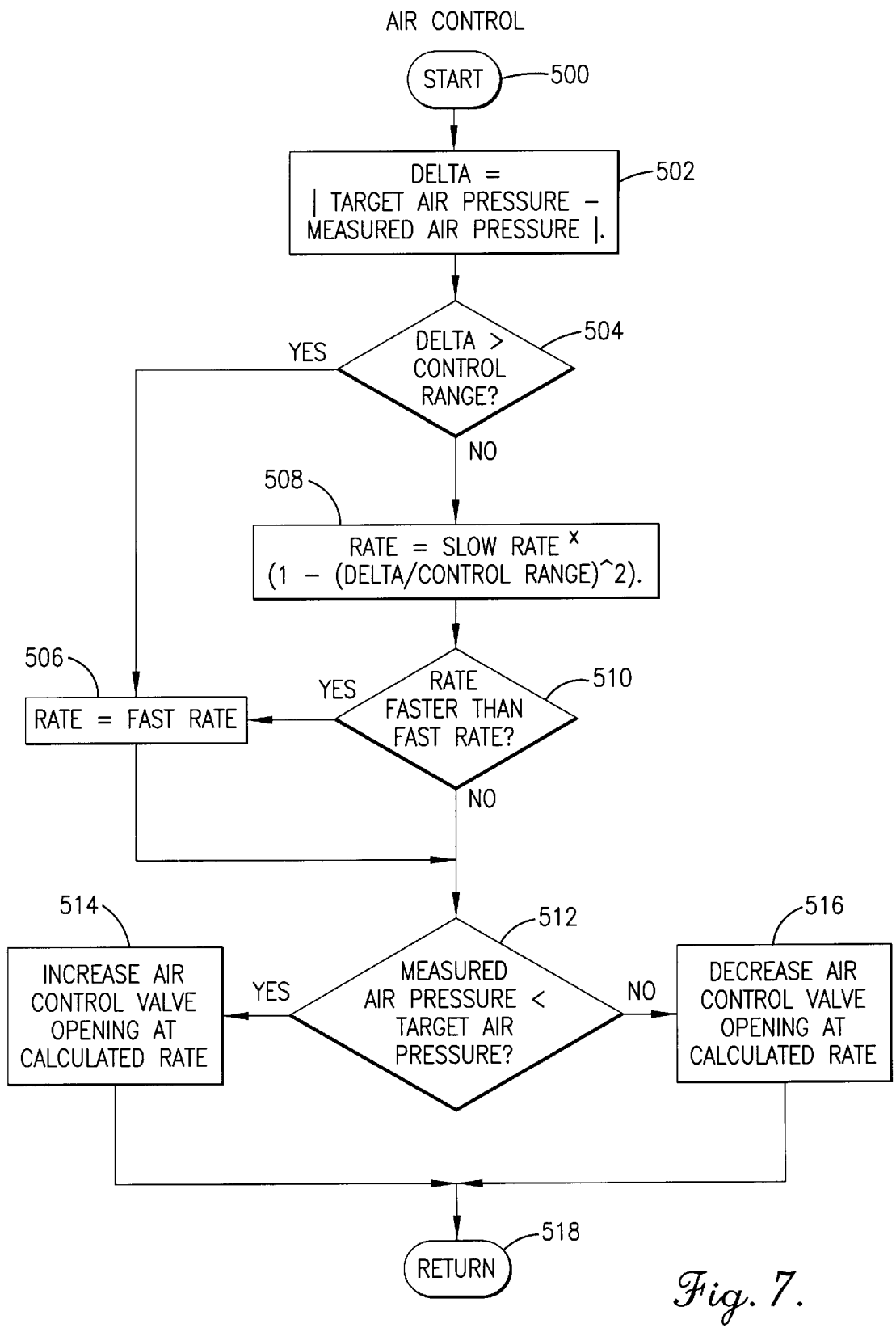

Upon completion of the subroutine CALCULATE TARGET AIR PRESSURE, processing advances to step 92, as indicated in FIG. 2, for execution of the AIR CONTROL subroutine, illustrated in FIG. 7. Upon the start of AIR CONTROL subroutine, as indicated by reference numeral 500, DELTA is defined as the absolute value of TARGET AIR PRESSURE minus MEASURED AIR PRESSURE, as indicated at step 502. The TARGET AIR PRESSURE is that value determined in subroutine CALCULATE TARGET AIR PRESSURE, previously discussed. The MEASURED AIR PRESSURE is the air pressure value actually measured by air pressure sensor 42.

At step 504, controller 30 determines whether DELTA is greater than CONTROLRANGE. Again, as before, the operator has selected and entered, using keypad 35, a CONTROLRANGE for air pressure, a FASTRATE, and a SLOWRATE. In many applications, the SLOWRATE is 10 and 15 hundreds of seconds, the FASTRATE is approximately 1–5 hundreds of seconds, and the CONTROLRANGE is approximately 2–5 psi. When controller 30 determines at step 504 that DELTA is greater than the CONTROLRANGE, processing advances to step 506 where controller 30 defines rate as the FASTRATE. When, however, it is determined at step 504 by controller 30 that DELTA is not greater than CONTROLRANGE, processing advances to step 508, where rate is defined by the equation:

$$RATE = SLOWRATE \times (1 - (\Delta/CONTROLRANGE)^2)$$

At step 510, controller 30 determines whether the RATE is faster than the FASTRATE and, when the RATE is faster, processing advances to step 506 to clamp the RATE at the FASTRATE. When, however, it is determined at step 510 that the RATE is not faster than the FASTRATE, processing advances to step 512, where controller determines whether the MEASURED AIR PRESSURE is less than the TARGET AIR PRESSURE. When the MEASURED AIR PRESSURE is indeed less than the TARGET AIR PRESSURE, processing advances to step 514, where controller increases the air control valve opening at a calculated RATE. When, however, it is determined at step 512 that MEASURED AIR PRESSURE is not less than the TARGET AIR PRESSURE, processing advances to step 516, where controller decreases the air control valve opening at the calculated RATE. Upon completion of either step 514 or 516, processing advances to step 518, and processing returns to the MAIN ROUTINE.

Figure 8:
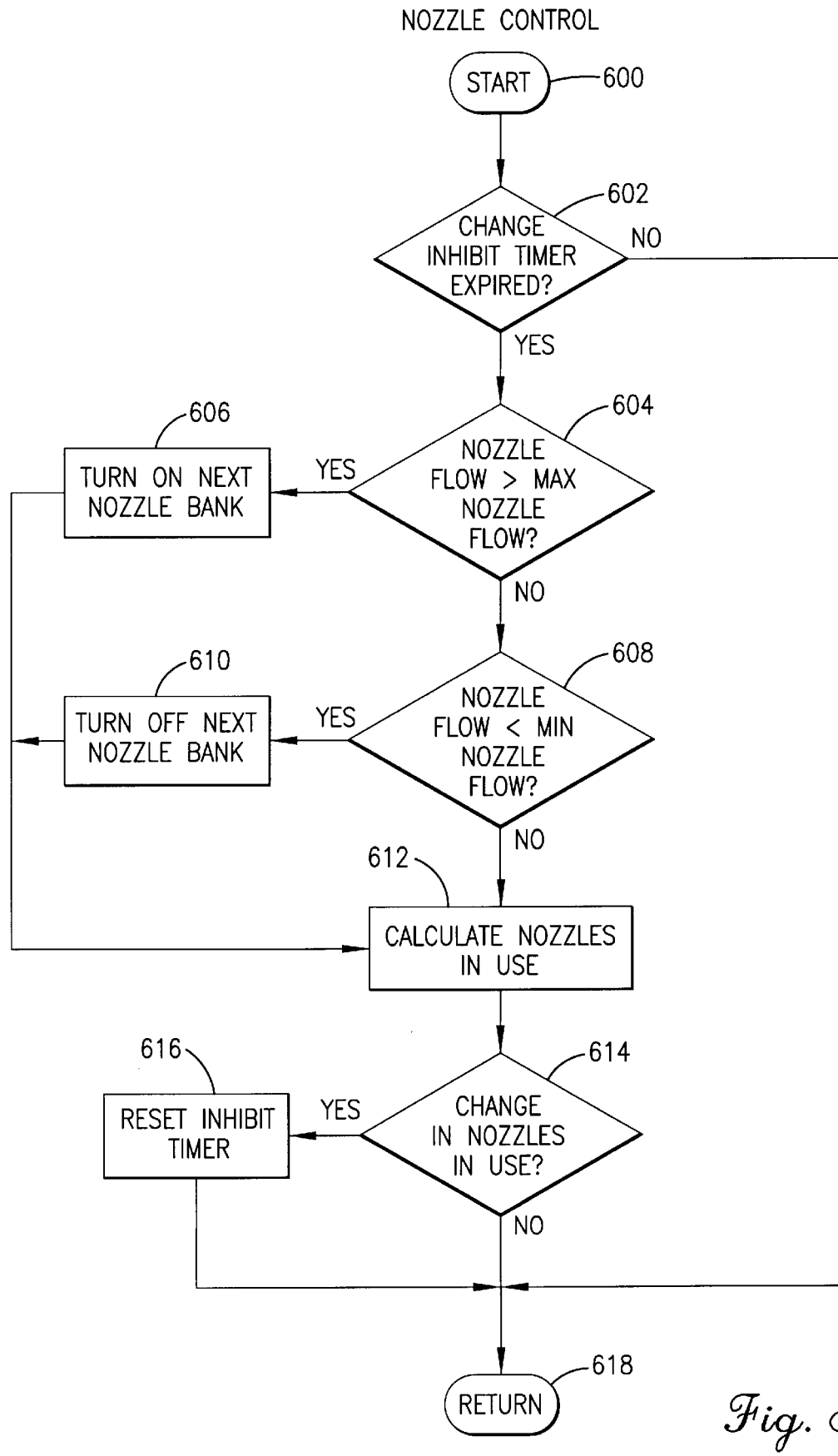

With reference now to FIG. 8, the subroutine NOZZLE CONTROL is illustrated and described. Upon the start of the NOZZLE CONTROL subroutine, as indicated by step 600, processing advances to step 602, where controller 30 determines whether a change inhibit timer has expired. In this regard, controller 30 has programmed therein a timer, preferably on the order of approximately 30 seconds which, as described below, will prevent a next bank of nozzles from being turned on or off, in the event the timer has not expired. Thus, in the event the change inhibit timer has not expired, processing returns to the MAIN ROUTINE, as indicated. When, however, controller 30 determines that the change inhibit timer has expired, processing advances to step 604, where controller 30 determines whether NOZZLE FLOW is greater than MAX NOZZLE FLOW. In this regard, NOZZLE FLOW is that value determined at step 404, in subroutine CALCULATE TARGET AIR PRESSURE of FIG. 6. The MAX NOZZLE FLOW is, of course, determined from the characteristics of the type of nozzles being utilized. In the event controller 30 determines at step 604 that NOZZLE FLOW is grater than MAX NOZZLE FLOW, processing advances to step 606 where controller 30 turns on a next bank of nozzles. In this regard, as described above, control system 10 preferably has a plurality of banks of nozzles, with each bank of nozzles including a plurality of nozzles. Upon completion of step 606, processing advances to step 608, where controller 30 calculates the number of nozzles in use. In the event, that, at step 606, all nozzle banks were already turned on, no action is taken and processing simply advances to step 608.

When, however, it is determined by controller 30 at step 604 that NOZZLE FLOW is not greater than MAX NOZZLE FLOW, processing advances to step 610, where controller 30 determines whether NOZZLE FLOW is less than the MIN NOZZLE FLOW. As will now be understood, the MIN NOZZLE FLOW is determined from the nozzle characteristics stored in memory. When controller 30 determines at step 610 that NOZZLE FLOW is less than the MIN NOZZLE FLOW, processing advances to step 612, where controller 30 turns off the next bank of nozzles. Upon completion of step 612, processing advances to step 608, where controller calculates the number of nozzles in use. Upon completion of step 608, processing advances to step 610 where controller determines whether there was a change in the number of nozzles in use. In the event there was a change in the number of nozzles in use, processing advances to step 612, where controller resets the inhibit timer. Thus, upon any change of the number of nozzles in use, the inhibit timer must first expire before additional change will be made. Upon completion of step 602, or 610, or 612, processing returns to the MAIN ROUTINE as indicated by step 614.

Then NOZZLE CONTROL subroutine thus permits nozzles to be turned on and off depending upon the size of the system under control, or the operating conditions therein. In other words, depending upon the amount of cooling of the inlet gas temperature required, the nozzles can be controlled so that the number of nozzles utilized is efficient, while maintaining each nozzle within its maximum efficiency range. For example, taking the case of MIN NOZZLE FLOW, each nozzle has a minimum pressure that is required to maintain a spray outlet from the nozzle. This phenomena is typically referred to as TURN-DOWN RATIO, and is often on the order of 10 to 1 for the type of nozzles utilized in such systems. As will be appreciated, as the flow of a nozzle is reduced to a minimum, the nozzle will eventually simply dribble. Such a dribble is, of course, inefficient, and in such a case, a bank of nozzles will be turned off so that the total water flow is distributed through less nozzles, thereby resulting in an increase of water flow from those nozzles remaining in an on state. At the opposite end of the spectrum, it will be appreciated that when the flow from the nozzles is greater than the upper threshold defined by the maximum nozzle flow characteristic, additional nozzles are turned on so that the liquid is more evenly and efficiently distributed to a greater number of nozzles. Upon completion of the NOZZLE CONTROL subroutine, processing returns to the beginning of the MAIN ROUTINE.

Returning now to step 84 of the MAIN ROUTINE as illustrated in FIG. 2, when controller 30 determines that the mill or other industrial equipment is in a transition mode, as indicated as step 84, processing advances to step 96 for operation of the TRANSITION MODE CONTROL subroutine. As shown, execution of the TRANSITION MODE CONTROL subroutine bypasses the TEMPERATURE CONTROL subroutine, previously described in connection with FIG. 3. The TRANSITION MODE CONTROL subroutine is activated by controller 30 when the mill or other industrial equipment is in a TRANSITION MODE, such as when changing from an off to on state, or vice versa. Upon start up of the TRANSITION MODE CONTROL subroutine, as indicated at step 200 of FIG. 4, processing advances to step 202, where controller determines whether the mill is off. When the mill is off, processing advances to step 204, where controller 30 sets TARGET FLOW to the last TARGET FLOW stored in memory for the last mill off condition. In this regard, the first time system 10 is activated, upon startup, set up parameters are unknown. System 10 determines these values by adjusting control parameters to achieve the desired outlet temperature, as described, and then stores these settings into memory. This operation occurs for both a mill on and a mill off condition. Once these values are learned for the first time, and stored in memory, system 10 retrieves the setting values from memory and uses these settings for subsequent system operation. When controller 30 determines at step 202 that the mill is on, processing advances to step 206, where TARGET FLOW is set to the last TARGET FLOW stored in the mill on condition. Processing then advances to step 208, where controller 30 determines whether the MEASURED TEMPERATURE, measured by a selected temperature transmitter 18, 22, is approaching the TARGET TEMPERATURE. In the event the MEASURED TEMPERATURE is not approaching the TARGET TEMPERATURE, processing advances to step 210, where controller 30 sets the mill on to off TRANSITION MODE to false. When, however, the MEASURED TEMPERATURE is approaching the TARGET TEMPERATURE, processing advances to step 212, where controller 30 determines whether the MEASURED TEMPERATURE is within the selected CONTROL RANGE TARGET TEMPERATURE. In the event the MEASURED TEMPERATURE is indeed within the CONTROLRANGE, processing advances to step 210, where controller sets the mill on to off TRANSITION MODE to false. When, however, controller 30 determines at step 212 that the MEASURED TEMPERATURE is not within the CONTROLRANGE of the TARGET TEMPERATURE, processing returns to the main subroutine, as indicated at step 214. Thus, system 10 rapidly transitions to the settings required to prevent emissions from air pollution control equipment, utilizing the stored TARGET FLOW data, determined through previous operation of the system. Once the system 10 is operating at the settings retrieved from memory, the system 10 fine tunes itself to achieve the desired outlet gas temperature, and learns the new setting necessary to achieve this temperature. As conditions change, system 10 adjusts to meet these changes and maintain operating conditions as desired, and stores the changes so that they can be utilized subsequently. Particularly, as illustrated in FIG. 3, when system 10 operates within the defined control range for a selected period of time, preferably 5 minutes, controller 30 stores a data value indicative of the gallons per minute flow of liquid from the nozzles 56 at that stable operating condition of the system. Thus, once stable operating conditions are known for mill on and mill off situations, these values can be retrieved later when the mill undergoes transition, thereby drastically reducing the transition time.

Accordingly, the present invention is one well adapted to attain the objects set forth above, and the additional objectives set forth throughout the specification. Particularly, the present invention is useful for preventing temperature overshoot and over correction problems, when conditioning hot industrial gases, by controlling nozzles 56 to slow the introduction of water into the chamber as the actual temperature within the chamber approaches the desired temperature. Particularly, utilizing the equation set forth herein, when the actual temperature within the conditioning chamber is within a predetermined CONTROLRANGE, the nozzles are continuously adjusted according to an inverted parabolic function, thus causing the temperature change to decelerate and the actual temperature approaches the target temperature. Additionally, through utilization of stored nozzle characteristics, memory for a plurality of nozzle types, the system can be easily changed to accommodate different types of nozzles. Moreover, in view of the unique nozzle control features of the present invention, the nozzles 56 utilized may be efficiently maintained within their optimum performance parameters.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. An evaporative gas conditioning system for conditioning gas, resulting from an industrial process, to a desired temperature, said conditioning system comprising:
   a conditioning chamber having an inlet and an outlet, wherein said gas flows through said conditioning chamber from said inlet to said outlet;
   a plurality of nozzles positioned within said conditioning chamber;
   a liquid supply line connected to each said nozzle;
   a liquid flow controller, including a liquid flow control valve connected in said liquid supply line;
   a temperature sensor, positioned at a selected location relative to said conditioning chamber, for sensing the temperature of said gas;
   a controller connected to said liquid flow controller, wherein said controller receives a signal, from said temperature sensor, indicative of the actual temperature of said gas and determines a difference between said actual gas temperature and said desired gas temperature and, when said temperature difference is outside a selected temperature range, then a first desired liquid flow rate is selected and, when said temperature difference is within a selected temperature range, then a second desired liquid flow rate is selected, wherein said second desired liquid flow rate is a function of said temperature difference and said selected temperature range.

2. The evaporative gas conditioning system as set forth in claim 1, further comprising:
   a liquid flow rate detector for detecting the flow rate of liquid from said nozzles;
   wherein said controller receives a signal, from said liquid flow rate detector, indicative of the actual flow rate of liquid from said nozzles and determines a difference between said actual liquid flow rate and said selected, desired liquid flow rate and, when said liquid flow rate difference is outside a selected range, then a first desired rate of controlling said liquid flow control valve is selected and, when said liquid flow rate difference is within a selected range, then a second desired rate of controlling said liquid flow control valve is selected.

3. The evaporative gas conditioning system as set forth in claim 2, wherein said second desired rate is a function of said liquid flow rate difference and said selected flow rate range.

4. The evaporative gas conditioning system as set forth in claim 3 wherein, when said actual liquid flow rate is less than said selected, desired liquid flow rate, then an opening of said liquid control valve is increased at said selected, desired rate of controlling said valve and, when said actual liquid flow rate is not less than said selected, desired liquid flow rate, an opening of said liquid control valve is decreased at said selected, desired rate of controlling said valve.

5. The evaporative gas conditioning system as set forth in claim 4 further comprising:
   an air supply line connected to each said nozzle;
   an air pressure sensor connected in said air supply line for sensing the pressure of air supplied to said nozzles;
   an air pressure controller, including an air pressure control valve connected in said air supply line;
   wherein said controller receives a signal, from said air pressure sensor, indicative of the actual pressure of air supplied to said nozzles and determines an air pressure difference between said actual air pressure and a desired air pressure and, when said air pressure difference is outside a selected range, then a first desired rate of controlling said air pressure control valve is selected and, when said liquid flow rate difference is within a selected range, then a second desired rate of controlling said air pressure control valve is selected.

6. The evaporative gas conditioning system as set forth inc claim 5 wherein said desired air pressure is a function of characteristics associated with said nozzles.

7. The evaporative gas conditioning system as set forth in claim 6 wherein said desired air pressure is further a function of the volume of liquid flow from said nozzles.

8. The evaporative gas conditioning system as set forth in claim 5, wherein said second desired rate is a function of said air pressure difference and said selected air pressure range.

9. The evaporative gas conditioning system as set forth in claim 8 wherein, when said actual air pressure is less than said selected, desired air pressure, then an opening of said air flow control valve is increased at said selected, desired rate of controlling said valve and, when said actual air pressure is not less than said selected, desired air pressure, an opening of said liquid control valve is decreased at said selected, desired rate of controlling said valve.

10. The evaporative gas conditioning system as set forth in claim 2, wherein said controller receives a signal, from said liquid flow rate detector, indicative of the flow rate of liquid from said nozzles and, based upon a relationship between the detected flow rate of liquid from said nozzles and a maximum and a minimum flow rate of said nozzles, controls the number of said nozzles of said plurality of nozzles that inject liquid into said conditioning chamber.

11. An evaporative gas conditioning system for conditioning gas, resulting from an industrial process, to a desired temperature, said conditioning system comprising:

a conditioning chamber having an inlet and an outlet, wherein said gas flows through said conditioning chamber from said inlet to said outlet;

a plurality of nozzles positioned within said conditioning chamber;

a memory for storing data indicative of performance characteristics of each said nozzle;

a liquid supply line connected to each said nozzle;

a liquid flow controller, including a liquid flow control valve connected in said liquid supply line;

an air supply line connected to each said nozzle;

an air flow controller, including an air flow control valve connected in said air supply line;

a temperature sensor, positioned at a selected location relative to said conditioning chamber, for sensing the temperature of said gas;

a controller connected to said liquid flow controller, said air flow controller and said memory, wherein said controller retrieves from said memory said performance characteristic data and uses said data to control said air flow controller to inject liquid droplets of a desired size through said nozzles into said conditioning chamber to thereby condition said gas from its sensed temperature to a desired temperature.

12. The evaporative gas conditioning system as set forth in claim 11, wherein said memory stores a look-up table comprising a first data value and a second data value for each said nozzle, wherein said first data value is indicative of a linear relationship between an air pressure over a range of liquid flow rates exhibited by each said nozzle in order to maintain said liquid droplets output from each said nozzle at said desired size, and wherein said second data value is indicative of a point at which said linear relationship graphically intercepts a y-axis representing pressure.

13. The evaporative gas conditioning system as set forth in claim 12 further comprising:

a liquid flow rate detector for detecting the flow rate of liquid from said nozzles;

wherein said controller receives a signal, from said liquid flow rate detector, indicative of the flow rate of liquid from said nozzles and, based upon a relationship between the detected flow rate of liquid from said nozzles and a maximum and a minimum flow rate of said nozzles, controls the number of said nozzles of said plurality of nozzles that inject liquid into said conditioning chamber.

14. An evaporative gas conditioning system for conditioning gas, resulting from an industrial process, to a desired temperature, said conditioning system comprising:

a conditioning chamber having an inlet and an outlet, wherein said gas flows through said conditioning chamber from said inlet to said outlet;

a plurality of nozzles positioned within said conditioning chamber;

a memory for storing data indicative of performance characteristics of each said nozzle;

a liquid supply line connected to each said nozzle;

a liquid flow controller, including a liquid flow control valve connected in said liquid supply line;

an air supply line connected to each said nozzle;

an air flow controller, including an air flow control valve connected in said air supply line;

a temperature sensor, positioned at a selected location relative to said conditioning chamber, for sensing the temperature of said gas;

a liquid flow rate detector for detecting the flow rate of liquid from said nozzles; and wherein said controller receives a signal, from said liquid flow rate detector, indicative of the flow rate of liquid from said nozzles and, based upon a relationship between the detected flow rate of liquid from said nozzles and a maximum and a minimum flow rate of said nozzles, controls the number of said nozzles of said plurality of nozzles that inject liquid into said conditioning chamber.

15. The evaporative gas conditioning system as set forth in claim 14, wherein said nozzles are organized into banks of nozzles, with each said nozzle being associated with a selected one of said banks of nozzles and wherein, when said detected flow rate of liquid from said nozzles is greater than said maximum flow rate of said nozzles, at least one bank of nozzles is controlled to begin injecting liquid into said conditioning chamber and wherein, when said detected flow rate of liquid from said nozzles is less than said minimum flow rate of said nozzles, at least one bank of nozzles is controlled to stop injecting liquid into said conditioning chamber.

16. An evaporative gas conditioning system for conditioning gas, resulting from an industrial process, to a desired temperature, said conditioning system comprising:

a conditioning chamber having an inlet and an outlet, wherein said gas flows through said conditioning chamber from said inlet to said outlet;

a plurality of nozzles positioned within said conditioning chamber;

a liquid supply line connected to each said nozzle;

a liquid flow controller, including a liquid flow control valve connected in said liquid supply line;

a temperature sensor, positioned at a selected location relative to said conditioning chamber, for sensing the temperature of said gas;

a controller connected to said liquid flow controller wherein, when a temperature of said gas is within a defined range relative to said desired temperature of said gas for a predetermined period of time, said controller stores, in a memory associated with the controller, a data value indicative of the volume of liquid flowing from the nozzles.

17. An evaporative gas conditioning system as set forth in claim 16, wherein said data value is indicative of liquid flow from said nozzles for an operating condition associated with said evaporative gas conditioning system and, wherein, when said controller determines that said operating condition is initially obtained, said controller retrieves said data value from memory, and utilizes said data value in the initial control of said system.

* * * * *